US008119180B2

(12) United States Patent
Liu et al.

(10) Patent No.: US 8,119,180 B2

(45) Date of Patent: Feb. 21, 2012

(54) METHOD FOR MAINTAINING FRESHNESS OF FRUITS AND VEGETABLES

(75) Inventors: John Xianrong Liu, Miami, FL (US); Virginia Margarita Fraga, Stoughton, MA (US); Thomas Young, Coral Gables, FL (US)

(73) Assignee: Del Monte Fresh Produce International Inc., Monte Carlo (MC)

( * ) Notice: Subject to any disclaimer, the term of this patent is extended or adjusted under 35 U.S.C. 154(b) by 655 days.

(21) Appl. No.: 11/919,449

(22) PCT Filed: Apr. 25, 2006

(86) PCT No.: PCT/US2006/015714

§ 371 (c)(1), (2), (4) Date: Oct. 26, 2007

(87) PCT Pub. No.: WO2007/123545

PCT Pub. Date: Nov. 1, 2007

(65) Prior Publication Data

US 2010/0069485 A1 Mar. 18, 2010

(51) Int. Cl.
*A61K 31/34* (2006.01)

(52) U.S. Cl. ......... 426/321; 426/541; 514/474; 514/629

(58) Field of Classification Search .................. 426/321
See application file for complete search history.

(56) References Cited

U.S. PATENT DOCUMENTS

| | | | | |
|---|---|---|---|---|
| 4,937,085 | A * | 6/1990 | Cherry et al. | 426/269 |
| 5,939,117 | A * | 8/1999 | Chen et al. | 426/267 |

OTHER PUBLICATIONS

G. A. González-Aguilar, et al., Physiological and quality changes of fresh-cut pineapple treated with antibrowning agents,vol. 37, Issue 3, May 2004, pp. 369-376.*

* cited by examiner

*Primary Examiner* — Lien T. Tran
*Assistant Examiner* — Philip Dubois
(74) *Attorney, Agent, or Firm* — John Dodds

(57) ABSTRACT

A process and a composition to extend the freshness of fruits and vegetables are disclosed. The method comprises treating fresh fruit or vegetable structures with a solution comprising organic acids including N-acetyl cysteine.

12 Claims, No Drawings

METHOD FOR MAINTAINING FRESHNESS OF FRUITS AND VEGETABLES

PRIORITY

This is national stage application under 35 U.S.C. section 371 of international application PCT/US2006/015714 filed on Apr. 25, 2006.

TECHNICAL FIELD

The present invention generally relates to a method to maintain freshness of fresh fruits and vegetables. The present invention relates to a method and a treatment solution which protects fresh plant structures from deterioration process. More particularly the present invention relates to a method and composition reducing bacterial population and retarding discoloration as well as other unwanted quality changes in fresh produce, particularly in fresh cut fruits and vegetables.

BACKGROUND ART

Usually edible plant structures, such as fruits and vegetables are very susceptible for deterioration and discoloration after harvest and during storage. The fresh fruits or vegetables are even more susceptible for deterioration when the fresh fruit or vegetable is sliced or peeled.

The appealing look of fresh fruits and vegetables is rapidly lost due to the spoilage caused by bacteria and discoloration caused by oxidation.

Various attempts have been made to increase the shelf life and storage life of edible fresh fruits and vegetables. Control over micro organism has been attained through various methods such as freezing, cooking, drying and dehydration. These methods, however alter the texture of the fruits and vegetables and they are not any more considered as fresh plant structures.

In order to maintain the texture of the vegetable or fruit as well as the freshness several chemical solutions have been disclosed for treatment of the plant structures.

Treatment with carboxylic acid has been used to decrease bacterial contamination from the treated surfaces. Similarly coppersulfate pentahydrate and hydrogenperoxide are known to decrease bacterial contamination.

The use of sulfite is widely known in the art of treating fresh fruits and vegetables to avoid discoloration. However, sulfite compounds usually leave residual taste and moreover they have postulated to have certain health risks.

Use of organic acids, such as citric acid and ascorbic acid is also known, but the acid baths as currently known seem to be of limited value and maintain the freshness only for a short time period.

L-cysteine has been suggested to be a potential anti-browning substance, but it obviously leaves residual taste.

There is clearly a need for a safe, easy and cost effective method to maintain the freshness of fruits and vegetables. The present invention therefore is directed to solve the problems of the previously disclosed methods.

DISCLOSURE OF INVENTION

The method according to this disclosure comprises contacting the fruits or vegetables or cuts thereof with an aqueous solution comprising only organic acids, including citric acid, erythorbic acid and N-acetyl cysteine.

The fruits or vegetables to be treated may be but are not limited to Apples, Apricots, Avocados, Baby Bananas, Bananas, Blueberries, Cantaloupe, Chayote, Cherries, Clementines, Coconuts, Cranberries, Fresh-Cut Pineapple, Grapes, Honeydew Melons, Mangoes, Nectarines, Oranges, Organic , Bananas, Organic Pineapple, Peaches, Pears, Pineapple, Plantains, Plums, Raspberries, Red Bananas (Morados), Strawberries, Yuca Root. Artichokes. Asparagus, Beets, Bok Choy, Broccoli, Brussels Sprouts, Cabbage. Carrots, Cauliflower, Celery, Cilantro, Endive, Escarole, Flower Kale, Green Flower, Green Leaf Lettuce, Green Onions, Iceberg Lettuce, Kale, Kohlrabi, Leeks, Mushrooms, Napa Cabbage, Onions, Parsley, Peeled Mini Carrots, Potatoes, Radish, Red Butter, Red Cabbage, Red Leaf Lettuce, Red Romaine, Romaine Hearts, Romaine Lettuce, Snap Peas, and Snow Peas.

The steps of a preferred embodiment of the method are as follows:

The fruits or vegetables can be pre-washed to reduce and remove unwanted materials such as debris with water containing an amount of chlorine which is effective to prevent cross contamination. The fruits or vegetables are then pared, sliced, cored, diced, or peeled. Alternatively, any combination of these processes may be used. After this the organic acid wash according to this disclosure is applied.

The entire surface of the cut fruit or vegetables can be contacted with the organic acid wash solution of this disclosure at a concentration effective to decrease the microbial load and inhibit the discoloration by conventional techniques such as dipping or spraying. The organic acid wash solution according to this disclosure comprises erythorbic acid, citric acid, and N-acetyl cysteine. According to a preferred embodiment the organic wash solution contains erythorbic acid, citric acid and N-acetyl cysteine in proportion of 6:3:1.

According to a preferred embodiment the organic wash solution is prepared from a dry stock comprising 60 w-% erythorbic acid, 30 w-% citric acid and 10 w-% N-acetyl cysteine (NAC).

Preferably, the concentration of the organic acid wash solution is 0.5% to 10% (w/v) in water. More preferably the concentration is 1-7% (w/v) in water and most preferably about 2-4% (w/v) in water.

The pH of the organic acid wash solution according to the invention is between 1.5 and 3.5, more preferably between 2.0 and 3.0 and most preferably between 2.1 and 2.4.

The cut fruits or vegetables are contacted with the organic acid wash solution of a time period effective to decrease the microbial load and inhibit the discoloration. Preferably the contact time is between 1 second and 10 minutes. More preferably the contact time is 30 seconds to 5 minutes, and most preferably about 1 to 2 minutes.

The plant material can be soaked or submerged in the treatment solution, but the solution can also be applied to the plant structures by spraying, pouring or any other convenient method.

After the wash, the treated fruits or vegetables are removed from the solution and drained for about 2 minutes and packed in polystyrene clamshell container or any other convenient container and stored at 36-40° F.

It is to be understood that further compounds commonly used for maintaining freshness of fruits and vegetables may also be included into the process of the present invention. The present invention is described by way of the following examples which are by no means meant to be limiting the scope of the invention.

EXAMPLE 1

Efficacy of an Organic Acid Wash on Bacteria Contamination of Green Onions

The objective of this study was to compare the organic acid wash with wash of water for reducing the total bacterial population on fresh cut green onions and to investigate the effect of concentration of N-Acetyl Cysteine (NAC) on the reduction of aerobic bacteria.

A stock dry mixture for the organic wash solution is prepared by mixing 60 w-% erythorbic acid, 30w-% citric acid and 10-w % of N-acetyl cysteine (NAC). This dry mixture is used for preparing the organic acid wash solution.

Two different concentrations of the organic acid wash were used 1.3% (w/v) and 3.25% (w/v) in water. pH was 2.37 for 1.3% wash solution and 2.25 for 3.25% wash solution respectively.

Green onions were chopped and immersed in the following three solutions for a period of 2 minutes respectively:

1. Tap water (control)
2. 1.3% organic acid wash
3. 3.25% organic acid wash

After the wash, onions were drained and sampled for microbiological analysis of aerobic plate count (APC). Five replications were performed. The results are shown in Table 1.

TABLE 1

Microbiological analysis of green cut onions washed with water or with solutions according to this disclosure (organic acid wash).

| Treatment | Water (control) | 1.3% organic acid wash | 3.25% organic acid wash |
|---|---|---|---|
| Sample 1 | 20,000 | 1100 | 400 |
| Sample 2 | 23,000 | 4000 | 300 |
| Sample 3 | 100,000 | 800 | 700 |
| Sample 4 | 77,000 | 1500 | 200 |
| Sample 5 | 18,000 | 900 | 700 |
| Average | 47,600 | 1660 | 460 |

The results clearly indicate that the organic acid wash is very effective in reducing the population of aerobic bacteria on cut green onions. The reduction obtained with the 3.25% organic acid wash is about 2 logs as compared to that obtained by water wash. Clearly the wash with 3.25% organic acid wash is also more effective than the wash with 1.3% organic acid wash.

EXAMPLE 2

Efficacy of an Organic Acid Wash on Bacteria Contamination of Cut Apples

The objective of this study was to compare a new organic acid wash comprising only organic acids with that of water for reducing the total bacterial population on fresh cut apples and to investigate the effect of concentration of the organic acid wash on the reduction of aerobic bacteria.

Fresh red apples were sliced, cored, inoculated with a multi-strain inoculum of aerobic bacteria, and then immersed in the following three solutions for 2 minutes respectively:

1. Tap Water (Control)
2. 1.3% organic acid wash
3. 3.25% organic acid wash

The 3.25% and 1.3% organic acid wash solutions were prepared from the dry stock as described in Example 1.

After the wash, products were drained and sampled for microbiological analysis of aerobic plate count (APC). Five replications were performed. The results are shown in Table 2.

TABLE 2

Aerobic Plate Count (CFU (colony forming units) of apple slices inoculated with multi strain inoculum of aerobic bacteria and washed with either water or with solution according to this disclosure.
Aerobic Plate Count (CFU/g)

| Treatments | Control (Water) | 1.3% organic acid wash | 3.25% organic acid wash |
|---|---|---|---|
| Sample 1 | 40,400 | 520 | 70 |
| Sample 2 | 16,600 | 1,800 | 170 |
| Sample 3 | 3,800 | 170 | 10 |
| Sample 4 | 8,200 | 260 | 130 |
| Sample 5 | 4,000 | 190 | 20 |
| Average | 14,600 | 590 | 80 |

The results indicate that the produce wash is very effective in reducing the population of aerobic bacteria on cut apples. The reduction obtained with the 3.25% organic acid wash was about 2.3 logs more than that obtained with water. Also the 3.25% organic acid wash is more effective than the 1.3% organic acid wash.

EXAMPLE 3

Effect of an Organic Acid Wash on the Shelf Life of Fresh Cut Apples

Whole apples (variety Granny Smith) were pre-washed with 7 ppm free chlorine (sodium hypochlorite) solution after which the apples were cored and sliced (12 sections per each apple). The apple slices for the control treatment were packed in clamshell containers without any wash and stored at 40° F. for the self life evaluations. The apple slices for wash treatment were dipped in the 3.25% (w/v) organic acid wash solution for 2 minutes. (The dry stock mixture was prepared as described in Example 1). The apple slices were then removed from the solution and drained for 2 minutes and packed in clamshell containers and stored at 40° F. for the shelf life evaluations. Sensory properties associated with deterioration during storage were evaluated. The results are expressed in Table 3 as mean score using a five point scale for appearance, aroma, and texture and flavor as follows:

5. excellent
4. good
3. marginal
2. poor (unacceptable)
1. very poor (unacceptable)

A score at 2.5 or below for any single sensory property (aroma, appearance, texture and flavor) marks the end of product shelf life. A mean score below 3.2 of all 4 sensory properties also marks the end of product shelf life.

TABLE 3

Effect of the organic acid wash with the solution (3.25%) according to the current discloses on the shelf life of fresh cut apples.

| Storage (Day) | Appearance | Texture | Flavor | Aroma | Average | Shelf life |
|---|---|---|---|---|---|---|
| Sensory Evaluation of Untreated Cut Apples (Control) | | | | | | |
| 0 | 2 | 5 | 5 | 5 | 4.3 | Unacceptable |
| 3 | 1 | 4 | 5 | 5 | 3.8 | Unacceptable |
| 6 | 1 | 4 | 5 | 5 | 3.8 | Unacceptable |
| 8 | 1 | 3 | 5 | 5 | 3.5 | Unacceptable |
| 14 | 1 | 2 | 3 | 5 | 2.8 | Unacceptable |
| Sensory Evaluation of Cut Apples Treated with the Produce Wash | | | | | | |
| 0 | 5 | 5 | 4 | 5 | 4.8 | Acceptable |
| 3 | 5 | 5 | 5 | 5 | 5.0 | Acceptable |
| 6 | 5 | 5 | 5 | 5 | 5.0 | Acceptable |

TABLE 3-continued

| Effect of the organic acid wash with the solution (3.25%) according to the current discloses on the shelf life of fresh cut apples. | | | | | | |
|---|---|---|---|---|---|---|
| Storage (Day) | Appear-ance | Texture | Flavor | Aroma | Average | Shelf life |
| 8 | 5 | 5 | 5 | 5 | 5.0 | Acceptable |
| 14 | 5 | 5 | 5 | 5 | 5.0 | Acceptable |

The Granny Smith apple slices without the organic acid wash treatment showed discoloration on day 0 and possessed a shelf life of less than one day. The apple slices treated with the organic acid wash showed excellent texture, flavor, aroma and no discoloration on day 14 and possessed a shelf life of more than 14 days.

EXAMPLE 4

Effect of an Organic Acid Wash on the Shelf Life of Fresh Cut Pears

Whole pears (variety Anjou) were pre washed with 7 ppm free chlorine (sodium hypochlorite) solution after which the pears were cored and sliced (12 sections per each pear). The pear slices for the control treatment were packed in clamshell containers without any wash and stored at 40° F. for the self life evaluations. The pear slices for wash treatment were dipped in the 3.25% (w/v) organic acid wash solution for 2 minutes. (The dry stock mixture was prepared as described in Example 1). The pear slices were then removed from the solution and drained for 2 minutes and packed in clamshell containers and stored at 40° F. for the shelf life evaluations. Sensory properties associated with deterioration during storage were evaluated. The results are expressed in Table 4 as mean score using a five point scale for appearance, aroma, and texture and flavor as follows:

5. excellent
4. good
3. marginal
2. poor (unacceptable)
1. very poor (unacceptable)

A score at 2.5 or below for any single sensory property (aroma, appearance, texture and flavor) marks the end of product shelf life. A mean score below 3.2 of all 4 sensory properties also marks the end of product shelf life.

TABLE 4

| Effect of the organic acid wash (3.25%) with the solution according to the current discloses on the shelf life of fresh cut pears. | | | | | | |
|---|---|---|---|---|---|---|
| Storage (Day) | Appear-ance | Texture | Flavor | Aroma | Average | Shelf life |
| Sensory Evaluation of Untreated Cut Pears (Control) | | | | | | |
| 0 | 2.8 | 5.0 | 5.0 | 5.0 | 4.5 | Acceptable |
| 3 | 2.5 | 4.3 | 4.5 | 4.0 | 3.8 | Unacceptable |
| 8 | 2.4 | 4.0 | 4.0 | 4.3 | 3.7 | Unacceptable |
| 14 | 2.1 | 4.0 | 3.0 | 3.5 | 3.2 | Unacceptable |
| Sensory Evaluation of Cut Pears Treated with the Produce Wash | | | | | | |
| 0 | 5.0 | 5.0 | 4.0 | 5.0 | 4.8 | Acceptable |
| 3 | 5.0 | 4.0 | 4.5 | 4.3 | 4.5 | Acceptable |
| 8 | 4.5 | 4.3 | 4.0 | 4.5 | 4.3 | Acceptable |
| 14 | 3.0 | 3.3 | 3.5 | 3.5 | 3.3 | Acceptable |

The Anjou pear slices without the organic acid wash treatment showed noticeable discoloration on day 3 and possessed a shelf life of less than 3 days. The pear slices treated with the organic acid wash showed acceptable appearance, texture, flavor, aroma on day 14 and possessed a shelf life of 14 days.

Although the foregoing invention has been described in some detail by way of illustration and example for purposes of clarity of understanding, it will be clear for one skilled in the art that certain changes and modifications may be practiced within the scope of the appended claims.

What is claimed is:

1. A process of treating fresh plant structures to maintain their shelf life by treating the plant structures with an 3.25 w-% aqueous solution at ambient temperature, wherein the solution consists of erythorbic acid, citric acid and N-acetyl cysteine in a proportion of 6:3:1, wherein the aqueous solution is maintained at a pH of less than about 3.5, and wherein the shelf life is comprised of the properties of aroma, appearance, texture and flavor.

2. The process according to claim 1, wherein the pH of the solution is between 1.5 and 3.5.

3. The process according to claim 1, wherein the plant structures are edible plant structures.

4. The process according to claim 1, wherein the plant structures are cut, peeled, sliced, cored or diced.

5. The process according to claim 1, wherein the plant structures are selected from the group consisting of Apples, Apricots, Avocados, Baby Bananas, Bananas, Blueberries, Cantaloupe, Chayote, Cherries, Clementines, Coconuts, Cranberries, Fresh-Cut Pineapple, Grapes, Honeydew Melons, Mangoes, Nectarines, Oranges, Organic , Bananas, Organic Pineapple, Peaches, Pears, Pineapple, Plantains, Plums, Raspberries, Red Bananas (Morados), Strawberries, Yuca Root, Artichokes, Asparagus, Beets, Bok Choy, Broccoli, Brussels Sprouts, Cabbage, Carrots, Cauliflower, Celery, Cilantro, Endive, Escarole, Flower Kale, Green Flower, Green Leaf Lettuce, Green Onions, Iceberg Lettuce, Kale, Kohlrabi, Leeks, Mushrooms, Napa Cabbage, Onions, Parsley, Peeled Mini Carrots, Potatoes, Radish, Red Butter, Red Cabbage, Red Leaf Lettuce, Red Romaine, Romaine Hearts, Romaine Lettuce, Snap Peas, and Snow Peas.

6. The process according to claim 1, wherein the plant structure is dipped into the solution for 1 s to 10 minutes.

7. The process according to claim 1, wherein the solution is sprayed on the plant structure.

8. The process according to claim 1, wherein the plant material is submerged in the solution.

9. A process of treating fresh plant structures to maintain their freshness by treating the plant structures with an aqueous solution at ambient temperature, said solution consisting of 1.95 wt% of erythorbic acid; 0.975 wt % of citric acid and; 0.325 wt % of N-acetyl cysteine.

10. The process according to claim 6, wherein the plant structure is dipped into the solution for 1 to 2 minutes.

11. A process for protecting fresh plant structures against microbial attack by treating said plant structures at ambient temperature with an aqueous antimicrobial solution having a concentration of about 3.25 w/v-%, said solution consisting of erythorbic acid , citric acid and N-acetyl cysteine in a proportion of 6:3:1, wherein said solution is maintained at a pH of less than about 3.5.

12. A process according to claim 11 wherein said microbial attack is an attack by aerobic bacteria.

* * * * *